June 27, 1967 W. F. LAWRENCE, JR 3,327,778

LOW THERMAL EMISSIVITY SHIELD

Filed April 17, 1963

INVENTOR.
WALTER F. LAWRENCE, JR.
BY
Morris Rabkin
ATTORNEY

United States Patent Office 3,327,778
Patented June 27, 1967

3,327,778
LOW THERMAL EMISSIVITY SHIELD

Walter Frederick Lawrence, Jr., Verona, N.J., assignor, by mesne assignments, to the United States of America as represented by the United States Atomic Energy Commission Filed Apr. 17, 1963, Ser. No. 273,739
5 Claims. (Cl. 165—134)

The invention described herein was made in the course of, or under, a contract with the Atomic Energy Commission.

This invention relates to improved, low thermal emissivity shields, which may be especially useful in combination with thermoelectric devices.

To operate a thermoelectric generator of the type employing the Seebeck effect efficiently, it is desirable to reduce heat losses and thermal shunts so that the maximum amount of available heat is channeled directly through the thermoelements of the thermoelectric generator for conversion into electrical power. For example, in a thermal system where the heat source for the thermoelements is a conduit through which a high themperature fluid is conveyed, the wasteful rediation of heat from the conduit and from the hot side of the thermoelectric generator should be minimized if the maximum temperature differential and, hence, the efficient operation of the system is to be realized. This may be accomplished by providing the conduit and portions of the thermoelectric generator with a low thermal emissivity shield in accordance with the present invention.

It has been proposed to reduce the wasteful radiation of heat from a thermal system by coating the heat radiating members of the system with a low emissivity element, such as gold, for example. Where, however, portions of the thermal system comprise metals, such as stainless steel, iron, and/or copper, for example, that are hot during operation and that alloy easily with gold, especially at relatively high temperatures, the direct application of gold to surfaces of such metals is not desirable because the gold combines with, and/or diffuses into, these metals and loses its effectiveness as a heat shield. It has also been proposed to apply gold foil to the heat radiating members of the thermal system, but this procedure is also not deemed desirable because of the relatively high cost involved, the difficulty in making the gold foil stick to the metals under conditions of vibration, and the ultimate alloying, diffusing, and/or reacting of the gold with the metals to which it is attached at high temperatures of operation.

It is an object of the present invention to provide an improved, low thermal emissivity shield that overcomes or greatly reduces the aforementioned disadvantages of prior art shields when employed in a thermal system adapted to operate at relatively high temperatures.

Another object of the present invention is to provide an improved, low thermal emissivity shield for preventing the radiation of heat from parts of a thermal system that would normally alloy with low thermal emissivity, metal coatings at relatively high temperatures.

Still another object of the present invention is to provide an improved, low thermal emissivity shield that is relatively light in weight, bendable and formable, and applicable to a thermal system after the latter is constructed.

A further object of the present invention is to improve the efficiency and ruggedness of a thermoelectric generator.

Still a further object of the present invention is to provide an improved, low thermal emissivity shield that is relatively simple in structure, reliable in operation, and highly efficient in use.

In accordance with the present invention, an improved, low thermal emissivity shield is provided which may be used in a thermoelectric generator. The low thermal emissivity shield comprises a formable, barrier sheet of a metal, such as molybdenum, for example, that is relatively unreactive with the aforementioned metals of the thermal system, and a coating. The coating is a low thermal emissivity element, such as gold, to which the barrier material is also relatively unreactive. The coated, barrier sheet is secured to the heat radiating parts of the thermal system by any suitable means, such as straps or welding, for example, to provide a low emissivity shield for these parts.

The shield provides means in the thermal system to reduce thermal radiation from heated metals, such as stainless steel, iron, or copper, for example, that would normally react, chemically or physically, with coatings or layers of low thermal emissivity elements, such as gold or silver, at relatively high temperatures.

By the term "unreactive," as used herein, is meant substantially non-alloying and/or not entering into any chemical reaction at the temperatures of operation of the materials involved.

The novel features of the present invention, both as to its organization and method of operation, as well as additional objects and advantages thereof, will be more readily understood from the following description, when read in connection with the accompanying drawing, in which similar reference characters refer to similar parts throughout, and in which.

Figure 1:
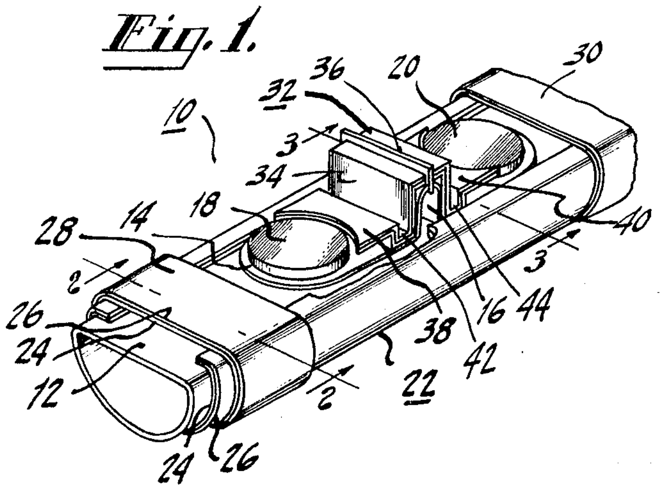
FIG. 1 is a perspective view of a thermal system for supplying heat to a thermoelectric generator wherein a heat conducting conduit and a portion of the thermoelectric generator are provided with low thermal emissivity shields in accordance with the present invention.

Referring now, particularly to FIG. 1 of the drawing, there is shown a thermal system 10 having a tube 12 for conducting heat to the hot strap 14 of a thermoelectric generator. The tube 12 may be made of stainless steel and serves as a conduit for a heat conveying medium, such as molten sodium and potassium metals. The hot strap 14 may comprise a strip of copper that is bonded to the tube 12 in a heat exchange relationship therewith. The hot strap 14 is formed with an upwardly extending looped portion 16 about the middle thereof to provide slack for the expansion and contraction of the hot strap 14 during the operation of the thermal system 10. If more than one thermoelectric generator is to be fixed in a heat relationship with respect to the tube 12, the hot straps 14 should be insulated from the tube 12 by electrical insulators (not shown) of alumina, or the like, in a manner known in the art.

The complete thermoelectric generator of which the hot strap 14 is a part is not illustrated or further described herein because it is not necessary to do so for an understanding of the invention. Suffice it to say that N-type and P-type semiconductor thermoelements, for example, may be bonded to metal shoes 18 and 20, respectively, to form a thermoelectric generator that operates by the Seebeck effect. The shoes 18 and 20 are bonded to opposite ends, respectively, of the strap 14.

Means are provided to prevent heat from being radiated into the ambient from the tube 12. To this end, a low thermal emissivity shield 22 is secured to the exposed portions of the tube 12. The shield 22 comprises a barrier sheet 24 of a material that does not react or combine easily with the material of the tube 12 at the high temperatures of operation of the thermal system 10. Where the material of the tube 12 is stainless steel, the barrier sheet 24 may be a thin sheet of molybdenum about one mil in thickness. A bright, shiny layer or coating 26 of gold, also relatively unreactive with the barrier sheet 24, is deposited on the outer surface of the barrier sheet 24 to provide the shield 22 with its low thermal emissivity characteristics. A shield having a bright, shiny surface of gold has been found to serve as an excellent, durable shield for preventing the radiation of heat from the shielded parts into the ambient. The heat emissive power of a surface has been defined as the ratio of the rate of loss of heat per unit area of the surface at a given temperature to the rate of loss of heat per unit area of a black body at the same temperature and with the same surroundings. The values of emissive power range from 1.0 for lamp black down to about 0.04 for polished gold.

Figure 2:
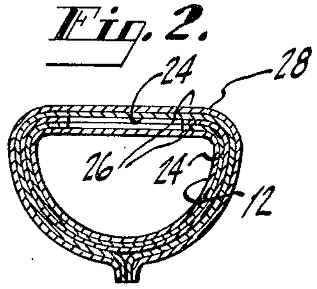
FIG. 2 is a cross-sectional view taken along the line 2—2 of FIG. 1 and viewed in the direction indicated by the appended arrows.

The shield 22 may be secured to the tube 12 by any suitable means, such as welding or binding. In the embodiment of the thermal system 10 illustrated in the drawing, the shield 22 is secured to the tube 12 by means of straps 28 and 30 of the same material as the shield 22. These straps also serve to enclose most of the top surfaces of the tube 12 in a low emissivity shield. Thus, each of the straps 28 and 30 comprises a barrier layer 24 of molybdenum coated with a bright coating 26 of gold. The straps 28 and 30 may have their ends welded or bound to each other, as shown in FIG. 2, to fix the shield 22 securely to the tube 12. If the gold coating 26 were not separated from the metal of the tube 12 by the barrier sheet 24 of molybdenum, the gold coating 26 would diffuse into the metal of the tube 12 at the relatively high temperatures of operation of the thermal system 10, causing the surface of the tube 12 to become dull, and thereby reducing the effectiveness of the gold coating 26 as a low thermal emissivity means.

The gold coating 26 applied to the barrier sheet 24 of molybdenum may be a coating of liquid bright gold, such as sold in the trade under the name of Hanovia Liquid Bright Gold, No. 8146, produced by the Hanovia Liquid Gold Division of Englehart Industries, Inc., East Newark, N.J., or Du Pont Liquid Bright Gold No. 4063, produced by E. I. du Pont de Nemours and Co., Wilmington, Del. The gold coated molybdenum is first fired in air at a temperature of about 375° C. for 15 minutes. As many coats of liquid gold as desired may be applied to the barrier sheet 24 of molybdenum. Three to five coats have been found satisfactory in the low emissivity shield of the present invention. The gold coated barrier sheet is then fired in hydrogen at a temperature of about 850° C. for about 5 minutes. The gold coated molybdenum now comprises a thin, bendable and formable, barrier sheet of molybdenum coated with a bright, shiny coating 26 of gold that adheres tenaciously to the barrier sheet 24. If desired, additional gold may be electroplated onto the previously applied gold coating 26.

Liquid bright gold of the aforementioned types may comprise a gold mercaptan that is the reaction product of a gold salt and an organic mercaptan resin. This reaction product is a gold complex mercaptan that is soluble in an organic solvent, such as nitrobenzene or an essential oil, such as oil of cloves. A small amount of rhodium resinate is also dissolved in the solvent to cause the gold complex mercaptan solution to form a continuous film of gold, when fired, on the clean surface to which it is applied.

Figure 3:
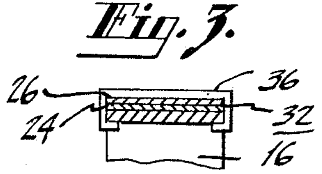
FIG. 3 is a fragmentary, cross-sectional view taken along the line 3—3 of FIG. 1 and viewed in the direction indicated by the appended arrows.

A low emissivity shield 32 of the same material as the shield 22 is provided to cover some of the exposed portions of the hot strap 14 to prevent the radiation of heat therefrom into the ambient. The shield 32 is bent to conform subsantially to the shape of the hot strap 14. A looped portion 34 of the shield 32 covers the looped portion 16 of the hot strap 14. The shield 32 is secured to the hot strap 14 by means of a metal clip 36, the ends of the clip 36 being hooked around the underside of the looped portion 16 of the strap 14, as shown in FIG. 3. Outwardly extending portions 38 and 40 from opposite sides of the looped portion 34 of the shield 32 are formed with downwardly extending loops 42 and 44, respectively, to provide for the thermal expansion and contraction of the shield 32 during the operation of the thermal system 10.

From the foregoing description, it will be apparent that there have been provided improved, low thermal emissivity shields for various parts of a thermal system that would normally combine or react with low emissivity elements at high temperatures to thwart the effectiveness of the shields. While only two, improved, low thermal emissivity shields have been shown and described herein, variations in the structure and application coming within the spirit of this invention will, no doubt, readily suggest themselves to those skilled in the art. Hence, it is desired that the foregoing shall be considered as illustrative and not in a limiting sense.

I claim:

1. In combination,
(a) a hot strap for a thermoelectric device,
(b) a heat conducting member,
(c) means fixing said hot strap to said member in a heat exchange relationship therewith,
(d) first and second, thin, formable barrier sheets of a metal that is relatively unreactive with the material of said member,
(e) a coating of a low emissivity medium on said first and second barrier sheets, said low emissivity medium being characterized in that it is reactive with said heat conducting material if placed in contact with it at relatively high temperatures but relatively unreactive with said metal of said barrier layer,
(f) means securing said first barrier sheet over a portion of said member with said low emissivity medium being on the outer surface of said first barrier sheet, and
(g) means securing said second barrier sheet over said strap with said low emissivity medium being on the outer surface of said second barrier sheet.

2. In combination,
(a) a hot strap for a thermoelectric device,
(b) a heat conducting member of stainless steel,
(c) means fixing said hot strap to said member in a heat exchange relationship therewith,
(d) a first sheet of molybdenum having a gold coating thereon,
(e) means securing said first molybdenum sheet to said member in covering relationship therewith with said gold coating being on the outer surface of said sheet,
(f) a second sheet of molybdenum having a gold coating thereon, and
(g) means securing said second sheet to said strap in covering relationship therewith with said gold coating being on the outer surface of said sheet.

3. In combination,
(a) a low thermal emissivity shield,
(b) a thermoelectric device having a hot strap,
(c) a heat conducting member,
(d) means fixing said hot strap to said heat conducting member in a heat exchange relationship therewith,
(e) said heat exchange member being of a material with which gold reacts if placed in contact therewith at relatively high temperatures,
(f) said shield comprising first and second barrier sheets of molybdenum, each sheet having a layer of gold thereon,
(g) means securing said first barrier sheet in covering relationship on a portion of said heat conducting member with said gold layer being on the outer surface of said first sheet, and (h) means securing said second barrier sheet in covering relationship on said strap with said gold layer being on the outer surface of said second sheet.

4. In combination, (a) a thermoelectric device having a hot strap, (b) a heat conducting member, (c) means fixing said hot strap to said heat conducting member in a heat exchange relationship therewith, (d) said heat exchange member being of a material with which gold reacts if placed in contact therewith at relatively high temperatures, (e) a low thermal emissivity shield for increasing the efficiency of heat transfer to said hot strap, (f) said shield comprising a barrier sheet of molybdenum having a layer of gold thereon, and (g) means securing said barrier sheet in covering relationship on a portion of said heat conducting member with said gold layer being on the outer surface of said sheet.

5. The combination as in claim 4 wherein the material of said heat exchange member is stainless steel.

References Cited

UNITED STATES PATENTS

| | | | |
|---|---|---|---|
| 2,453,946 | 11/1948 | Sulfrian | 62—54 |
| 2,947,114 | 8/1960 | Hill. | |
| 3,007,596 | 11/1961 | Matsch | 62—45 X |
| 3,199,189 | 8/1965 | La Plante | 29—199 X |

ROBERT A. O'LEARY, *Primary Examiner.*

N. R. WILSON, M. A. ANTONAKAS, *Assistant Examiners.*